United States Patent [19]

Krawczyk et al.

[11] 4,396,107
[45] Aug. 2, 1983

[54] EQUIPMENT FOR THE TRANSPORT OF FLEXIBLE WORKPIECES

[75] Inventors: Stanislaw Krawczyk, Pabianice; Jerzy Nowak, Lodz; Tadeusz Pawlowski, Lodz; Jerzy Nowak, Lodz, all of Poland

[73] Assignee: Pfaff Industriemaschinen GmbH, Fed. Rep. of Germany

[21] Appl. No.: 232,560

[22] Filed: Feb. 9, 1981

[30] Foreign Application Priority Data

Mar. 26, 1980 [DE] Fed. Rep. of Germany ....... 3011568

[51] Int. Cl.³ .............................................. B65G 47/00
[52] U.S. Cl. ................... 198/346; 198/473; 198/479; 198/653; 294/104
[58] Field of Search ............... 198/473, 479, 480, 653, 198/695, 650, 678, 484, 680, 346; 294/104

[56] References Cited
U.S. PATENT DOCUMENTS 1,415,688  5/1922  Pade ..................................... 198/678
2,785,787  3/1957  Leavens, Jr. .................... 198/650 X
2,884,244  4/1959  Bowman ......................... 198/680 X Primary Examiner—Jeffrey V. Nase
Assistant Examiner—Dennis J. Williamson
Attorney, Agent, or Firm—McGlew and Tuttle

[57] ABSTRACT

A device for transporting flexible workpieces comprises one or more carrying brackets for holding the flexible workpieces having a substantially horizontal receiving rod for receiving the workpieces and a clamping lever movably mounted to the receiving rod having a spring connected thereto for biasing the clamping lever into a closed position to hold the workpieces. The clamping lever has an end portion which extends downwardly beyond the receiving rod so that when the carrying bracket is placed on a holding apparatus which has a support surface, the free end of the clamping lever causes the clamping lever to move into an open position, releasing the workpieces.

18 Claims, 3 Drawing Figures

U.S. Patent     Aug. 2, 1983     4,396,107
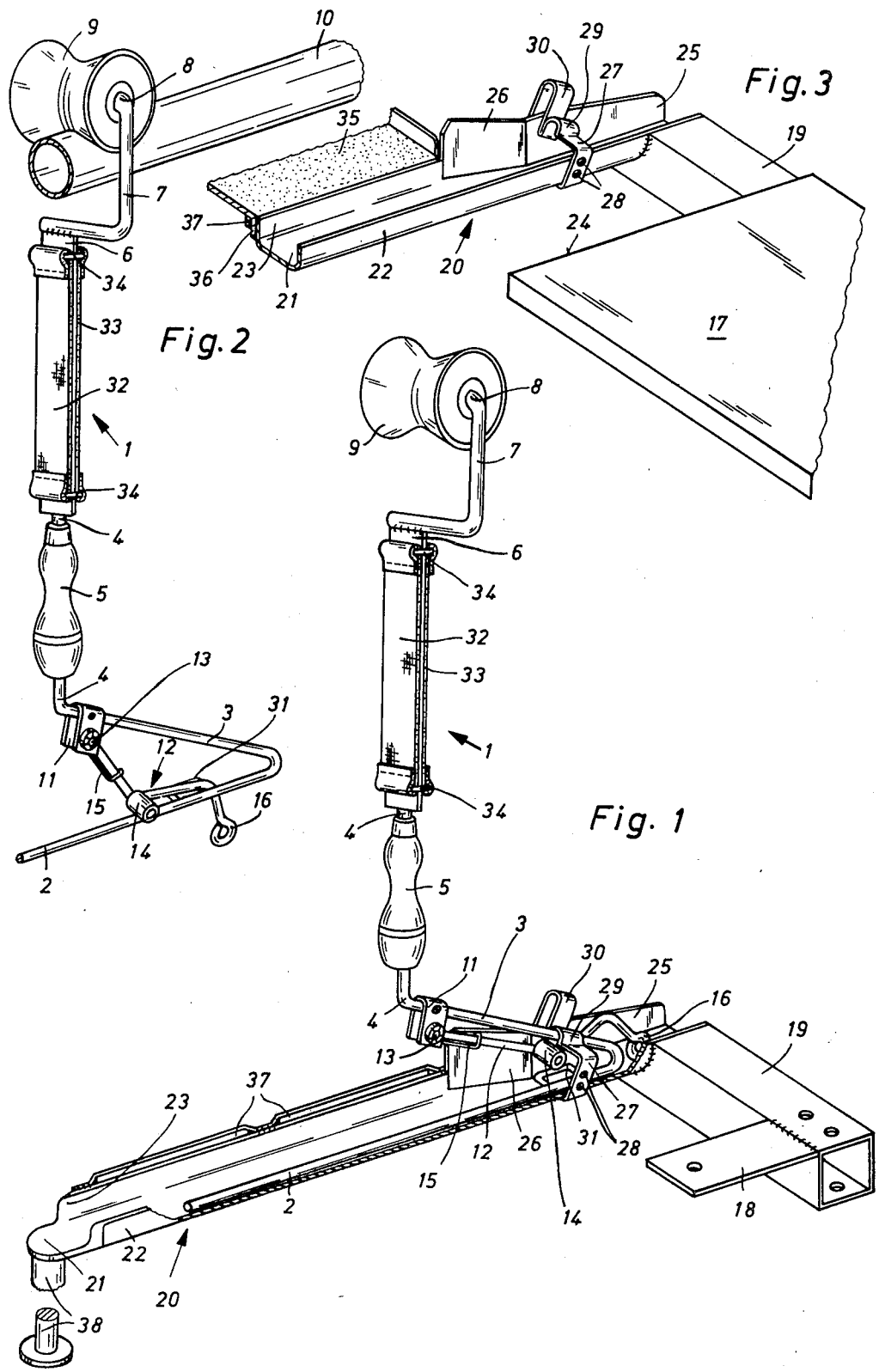

EQUIPMENT FOR THE TRANSPORT OF FLEXIBLE WORKPIECES

FIELD AND BACKGROUND OF THE INVENTION

The present invention relates in general to material handling equipment and in particular to a new and useful device for transporting flexible workpieces which automatically clamps and releases the workpieces for processing.

According to a method known in garment making, the cuttings to be processed are gathered up in individual bundles, and each bundle is hung in a folded state on the receiving rod of a carrying bracket and clamped. The carrying bracket is either hung on a rail of an overhead trolley or of a power-and-free conveyor and there transported to the various work stations, where, for the duration of the processing of the cuttings it can be unhooked from the rail, inserted in a holding device and thereafter hung on the rail again. Alternatively the carrying bracket may be assigned at only one work station and be carried by hand to the various other work stations.

Since the cuttings must be singled out for processing, it is necessary previously to release the clamping device of the carrying bracket. Releasing the clamping device is, in many cases, very inconvenient for the operator because with one hand he or she must grip the often heavily ladened carrying bracket, while opening the clamping device with the other hand, and must watch that the bundle of cuttings does not slip. In addition to this difficulty, the known holding devices do not ensure a secure hold of the carrying bracket.

SUMMARY OF THE INVENTION

To make it easier to handle the carrying bracket, it is an object of the present invention to provide equipment in which the clamping device of the carrying bracket is automatically opened when it is set down and automatically closed when it is raised again for transport.

According to the invention, under the weight of a loaded carrying bracket, a movable clamping lever thereof is pivoted, when the bracket is set down, from a clamping position into an open position. This releases the bundle of cuttings or other flexible workpieces, so that the cuttings can be taken off a receiving rod of the bracket, one at a time.

Accordingly, an object of the present invention is to provide a device for transporting flexible workpieces such as flexible cuttings, comprising, at least one carrying bracket for holding flexible workpieces having a substantially horizontal receiving rod for receiving the workpieces and a clamping lever movably mounted to the receiving rod for clamping the workpieces to the receiving rod in a closed position thereof, the clamping lever having a free end portion extending downwardly beyond the receiving rod when the clamping lever is in its closed position, and holding means for holding the carrying bracket, having a support surface against which the free end portion bears to move the clamping lever into an open position to unclamp the workpieces on the receiving rod.

A further object of the invention is to provide such a device wherein a plurality of such carrying brackets are removably carried on a rail.

A still further object of the invention is to provide such a device for transporting flexible workpieces wherein the holding means comprises a U-shaped holding track forming the supporting surface, the receiving rod including an outwardly extending foot member having a width substantially equal to the width of the U-shaped holding track in a portion of the track which is narrowed by a holding bracket. The carrying bracket is thus securely supported on the holding means.

Another object of the invention is to provide a device for transporting flexible workpieces which is simple in design, rugged in construction and economical to manufacture.

The various features of novelty which characterize the invention are pointed out with particularity in the claims annexed to and forming part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a perspective view of a device for transporting flexible workpieces according to the invention with portions cut away or deleted for clarity;

FIG. 2 is a perspective view of a part of the device in FIG. 1 showing a carrying bracket supported on a rail; and FIG. 3 is a perspective view of a part of FIG. 1 showing details of the holding means for supporting the carrying bracket.

DESCRIPTION OF THE PREFERRED EMBODIMENT

Referring to the drawings in particular, the invention embodied therein, in FIG. 1, comprises a carrying bracket generally designated 1 for carrying a plurality of flexible workpieces or cuttings (not shown) which is supported in a holding means generally designated 20 for holding the carrying bracket in an upright position and for unclamping the workpieces held in the carrying bracket.

The carrying bracket 1 of the new equipment illustrated in FIGS. 1 and 2 comprise a horizontal receiving rod 2 of round stock, extending obliquely upwardly at one end to form a strut 3 and terminating in a vertical section 4, on which a handle 5 is fastened. The vertical section 4 is connected by a fishplate 6 with a U-shaped bracket 7, whose upper leg serves as bearing axle 8 for a grooved roller 9 which rolls on a tubular rail 10 of an overhead trolley or a power-and-free conveyor.

A forked bearing piece 11 is fastened on strut 3 of the carrying bracket. The bent end 13, of a movable clamping lever 12, is mounted in forked piece 11 and serves as a bearing axle. The movable clamping lever 12 is bent for instance in S form, and carries a clamping roller 14. Under the action of a thigh spring 15, clamping lever 12 forms, together with the receiving rod 2, a clamping device for a bundle of cuttings. The free end 16 of the clamping lever 12 is shaped as a ring and extends downwardly beyond the receiving rod 2. Spring 15 biases lever 12 clockwise.

The clamping lever 12 is pivoted counterclockwise as seen in FIGS. 1 and 2 by its weight and that of the bundle of cuttings, bearing against end 16, as the carrying bracket 1 is set down on a support surface, and the clamping device is thus opened.

To give the carrying bracket 1 a sturdy and secure hold at the work station, a cross beam of the holding device 20, provided with an extension 18, is fastened on the underside of a table 17 of a work station (FIGS. 1 and 3). The holding device 20 comprises a holding track 21 of U-shaped cross-section firmly connected with the cross beam 19 and having flanges 22 and 23 open toward the top and extending in a horizontal plane parallel to the lateral table edge 24. The distance between the holding track 21 and the lateral edge 24 of the table top 17 can be varied by the use of cross beams of different lengths.

Near the cross beam 19, the holding track 21 has a narrowed section, formed on one side by flange 22 and on the other side by a sheet metal strip 25 fastened to flange 23. Preceding the narrowed section is a guide plate 26 disposed obliquely to the longitudinal axis of the holding track 21.

The upwardly open flanges 22, 23 of the holding track 21 are spanned by a holding bracket 27, which is fastened by means of screws 28 on the outside of the flanges 22, 23. The holding bracket 27 comprises a half-round arched portion 29 and laterally thereof another arched portion 30 extending upwardly over the arched portion 29. The holding bracket 27 is fastened to the holding track 21 in an oblique position such that the arched portions 29, 30 extend, referred to the inside face of track 21 serving as support surface for the carrying bracket 1 between flanges 22, 23, under the same angle as does the strut 3 to the receiving rod 2. The form and size of the arched portion 29 are adapted to strut 3, while the arched portion 30 is large enough to permit the unhindered pushing of the movable clamping lever 12.

To improve the stability of the carrying bracket 1 and to align the receiving rod 2 and strut 3 with the arched portion 29 when inserting bracket 1 into the holding device 20, the receiving rod 2 is provided with a foot 31, whose width matches the width of the narrowed section of track 21.

As clamping and holding means for additional cuttings or small parts, there are provided on both sides of the fishplate 6 of the carrying bracket 1 rubber bands 32,33, which are hooked by their looped ends in holding pins 34 which are welded on at the narrow edge of fishplate 6 and embrace the fishplate 6 from the narrow edge, for instance in fork form.

For depositing relatively small cuttings, an additional tray 35 is provided, which comprises bent insertion lobes 36 and can be inserted by the latter in eyes 37 on track 21.

The free end of the holding track 21 is supported by a telescoping stand 38.

At the work station, one of the carrying brackets 1 present on rail 10 of a suspension trolley or conveyor and laden with cuttings and small parts is unhooked and is pushed onto the holding track 21 with the cuttings hanging on the receiving rod 2 and clamped by the clamping lever 12 through the clamping roller 14, in such a way that the receiving rod 2 is between the flanges 22, 23. When the carrying bracket 1 sets down on the holding track 21, the clamping lever 12 is pivoted by the weight of the loaded carrying bracket 1 counter to the action of the thigh spring 15, thereby releasing the bundle of cuttings hanging on the holding track 21.

The carrying bracket 1 is then shifted toward the cross beam 19, being aligned by the foot 31 cooperating with the guide plate 26 relative to the arched portion 29 by the strut 3 and being inserted in the arched portion 29 of the holding bracket 27. As the carrying bracket 1 is being inserted in the holding device 20, the clamping lever 12 can pass through the arched portion 30 unhindered.

In the position illustrated in FIG. 1, with the clamping device open, the carrying bracket 1 has a secure and sturdy hold even under vibrations.

After all cuttings have been processed and hung on the holding track 21 combined in a bundle, the carrying bracket 1 is pulled out of the holding bracket 27 and lifted together with the bundle of cuttings, the clamping lever 12 being pivoted by the thigh spring 15 and pressed against the bundle by the clamping roller 14. The loaded carrying bracket 1 can then be taken to the next work station or hung on the rail 10.

While a specific embodiment of the invention has been shown and described in detail to illustrate the application of the principles of the invention, it will be understood that the invention may be embodied otherwise without departing from such principles.

What is claimed is:

1. A device for transporting flexible workpieces for a work station for work on the flexible workpieces, comprising, at least one carrying bracket for holding flexible workpieces having a substantially horizontal receiving rod for receiving the workpieces and a clamping lever movably mounted to the receiving rod for clamping the workpieces to the receiving rod in a closed position of the clamping lever, the clamping lever having a free end portion extending downwardly beyond the receiving rod when the clamping lever is in its closed position, and holding means for holding the carrying bracket, the holding means being attached to the workstation and having a horizontal support surface against which the free end portion bears to move the clamping lever into an open position for unclamping the workpieces on the receiving rod, the holding means including a portion for supporting flexible workpieces of a carrying bracket held by the holding means.

2. A device according to claim 1, including biasing means connected between the receiving rod and the clamping lever for biasing the clamping lever into its closed position.

3. A device according to claim 2, wherein the receiving rod includes an obliquely upwardly extending portion to which the clamping lever is pivotally mounted, the carrying bracket including a handle portion connected to the obliquely upwardly extending portion of the receiving rod and roller means connected to the handle, said device including a rail on which the roller means is removably engaged for supporting the carrying bracket when the carrying bracket is not supported on the holding means.

4. A device according to claim 3, including a fishplate connected between the roller means and the handle and at least one resilient flexible band connected to the fishplate for carrying additional workpieces between the flexible band and the fishplate.

5. A device according to claim 1, including biasing means connected between the receiving rod and the clamping lever for biasing the clamping lever into its closed position, the holding means comprising a U-shaped holding track having a narrowed end region, the receiving rod including an outwardly extending foot member having a width substantially the same as that of the narrowed end region of the holding track, the receiving rod and foot supported on the U-shaped holding track and narrowed end region thereof which defines the support surface.

6. A device according to claim 5, including a guideplate connected to said holding track defining said narrowed end region thereof including a portion which gradually reduces the width of the holding track toward the narrow end region thereof.

7. A device according to claim 5, including a cross beam connected to the holding track and a table connected to the cross beam forming said work station adapted for work on the flexible workpieces, the table top including an edge spaced from the holding track to accomodate flexible workpieces brought to the holding track by the carrying bracket.

8. A device according to claim 5, including eye means connected to the holding bracket and a tray connected to the eye means extending outwardly from the holding track.

9. A device according to claim 5, including telescoping stand means connected to the holding track adjacent an end thereof opposite the narrow end region for supporting the holding track.

10. A device according to claim 1, including biasing means connected to the clamping lever for biasing the clamping lever into its closed position, the receiving rod including an upwardly obliquely extending portion to which the clamping lever is connected, the holding means comprising a U-shaped holding track for receiving the receiving rod and an arched member connected to the holding track and extending thereover having an arched passage for receiving the upwardly obliquely extending portion of the receiving rod and for receiving the clamping lever.

11. A device for transporting flexible workpieces comprising, at least one carrying bracket for holding flexible workpieces having a substantially horizontal receiving rod for receiving the workpieces and a clamping lever movably mounted to the receiving rod for clamping the workpieces to the receiving rod in a closed position of the clamping lever, the clamping lever having a free end portion extending downwardly beyond the receiving rod when the clamping lever is in its closed position, holding means for holding the carrying bracket, the holding means having a support surface against which the free end portion bears to move the clamping lever into an open position for unclamping the workpieces on the receiving rod, and biasing means connected between the receiving rod and the clamping lever for biasing the clamping lever into its closed position, the receiving rod including an obliquely upwardly extending portion to which the clamping lever is pivotally mounted, the carrying bracket including a handle portion connected to the obliquely upwardly extending portion of the receiving rod and roller means connected to the handle, said device including a rail on which the roller means is removably engaged for supporting the carrying bracket when the carrying bracket is not supported on the holding means.

12. A device according to claim 11, including a fishplate connected beween the roller means and the handle and at least one resilient flexible band connected to the fishplate for carrying additional workpieces between the flexible band and the fishplate.

13. A device according to claim 11, including biasing means connected between the receiving rod and the clamping lever for biasing the clamping lever into its closed position, the holding means comprising a U-shaped holding track having a narrowed end region, the receiving rod including an outwardly extending foot member having a width substantially the same as that of the narrowed end region of the holding track, the receiving rod and foot supported on the U-shaped holding track and narrowed end region thereof which defines the support surface.

14. A device according to claim 13, including a guideplate connected to said holding track defining said narrowed end region thereof including a portion which gradually reduces the width of the holding track toward the narrow end region thereof.

15. A device according to claim 13, including a cross beam connected to the holding track and a table connected to the cross beam forming a work station adapted for work on the flexible workpieces, the table top including an edge spaced from the holding track to accommodate flexible workpieces brought to the holding track by the carrying bracket.

16. A device according to claim 13, including eye means connected to the holding bracket and a tray connected to the eye means extending outwardly from the holding track.

17. A device according to claim 13, including telescoping stand means connected to the holding track adjacent an end thereof opposite the narrow end region for supporting the holding track.

18. A device according to claim 11, including biasing means connected to the clamping lever for biasing the clamping lever into its closed position, the holding means comprising a U-shaped holding track for receiving the receiving rod and an arched member connected to the holding track and extending thereover having an arched passage for receiving the upwardly obliquely extending portion of the receiving rod and for receiving the clamping lever.

* * * * *